(12) United States Patent
Shimizu et al.

(10) Patent No.: US 8,057,101 B2
(45) Date of Patent: Nov. 15, 2011

(54) OIL IMPREGNATED SINTERED BEARING AND MANUFACTURING METHOD THEREOF

(75) Inventors: Teruo Shimizu, Tokyo (JP); Tsuneo Maruyama, Niigata (JP)

(73) Assignee: Diamet Corporation, Niigata-Shi (JP)

( * ) Notice: Subject to any disclaimer, the term of this patent is extended or adjusted under 35 U.S.C. 154(b) by 563 days.

(21) Appl. No.: 11/817,270

(22) PCT Filed: Nov. 14, 2005

(86) PCT No.: PCT/JP2005/020806
§ 371 (c)(1),
(2), (4) Date: Aug. 28, 2007

(87) PCT Pub. No.: WO2006/098060
PCT Pub. Date: Sep. 21, 2006

(65) Prior Publication Data
US 2008/0199115 A1   Aug. 21, 2008

(30) Foreign Application Priority Data

Mar. 16, 2005 (JP) .................................. 2005-075940

(51) Int. Cl.
*F16C 33/02* (2006.01)
(52) U.S. Cl. ........................................ 384/279; 384/902
(58) Field of Classification Search .................. 384/276, 384/279, 280, 286, 288, 289, 290, 902
See application file for complete search history.

(56) References Cited

U.S. PATENT DOCUMENTS

| 3,445,148 | A | * | 5/1969 | Grad et al. ..................... 384/279 |
| 4,509,803 | A | * | 4/1985 | Takenaka et al. ............... 384/13 |
| 5,120,091 | A | * | 6/1992 | Nakagawa ..................... 384/279 |
| 5,282,688 | A | * | 2/1994 | Kanezaki et al. ............. 384/279 |
| 6,223,437 | B1 | * | 5/2001 | Futterer ..................... 29/898.14 |
| 7,014,367 | B2 | * | 3/2006 | Miyasaka et al. ............. 384/279 |
| 7,553,445 | B2 | * | 6/2009 | Miyasaka ....................... 419/38 |
| 2005/0078894 | A1 | | 4/2005 | Miyasaka |

FOREIGN PATENT DOCUMENTS

| JP | 06-207619 A | 7/1994 |
| JP | 06-264926 A | 9/1994 |
| JP | 2002-122142 A | 4/2002 |
| JP | 2002-333024 A | 11/2002 |

(Continued)

OTHER PUBLICATIONS

US Office Action mailed Aug. 26, 2011 for the corresponding U.S. Appl. No. 12/856,381 (Divisional of the current application).

*Primary Examiner* — James Pilkington
(74) *Attorney, Agent, or Firm* — Leason Ellis LLP

(57) ABSTRACT

There is provided an oil-impregnated sintered bearing which enable to prevent oil leakage from an outer peripheral surface of an bearing body. The oil-impregnated sintered bearing includes a bearing body which is made of a porous sintered alloy containing vacancies and has a bearing hole in which a rotary shaft can be inserted, wherein the vacancies opened on an outer peripheral surface of the bearing body are crushed. The vacancies may be crushed in the state of a green compact, or in the state of a sintered alloy after sintering the green compact. Consequently, the oil leakage from the outer peripheral surface of the bearing can be prevented, and oil pressure in the bearing hole can be preserved.

2 Claims, 7 Drawing Sheets

FOREIGN PATENT DOCUMENTS

| | | | |
|---|---|---|---|
| JP | 2002-333025 A | 11/2002 | |
| JP | 2003-096502 A | 4/2003 | |
| JP | 2003-222133 A | 8/2003 | |
| JP | 2003-314533 A | 11/2003 | |
| JP | 2004-132403 A | 4/2004 | |
| JP | 2005-061429 A | 3/2005 | |
| WO | WO03/064873 | * | 8/2003 |

* cited by examiner

| WITHOUT TREATMENT | WITH TREATMENT |
|---|---|
| No.1 DENSITY 6.7g/cm$^3$  <br> SURFACE VACANCY RATE 20.07% | No.1 DENSITY 6.7g/cm$^3$  <br> SURFACE VACANCY RATE 5.23% |
| No.2 DENSITY 6.9g/cm$^3$  <br> SURFACE VACANCY RATE 18.96% | No.2 DENSITY 6.9g/cm$^3$  <br> SURFACE VACANCY RATE 3.53% |
| No.3 DENSITY 7.1g/cm$^3$  <br> SURFACE VACANCY RATE 14.57% | No.3 DENSITY 7.1g/cm$^3$  <br> SURFACE VACANCY RATE 7.23% |

OIL IMPREGNATED SINTERED BEARING AND MANUFACTURING METHOD THEREOF

CROSS REFERENCE TO RELATED APPLICATIONS

This is a U.S. national phase application under 35 U.S.C. §371 of International Patent Application No. PCT/JP2005/020806, filed Nov. 14, 2005 and claims the benefit of Japanese Application No. 2005-075940, filed Mar. 16, 2005. The International Application was published in Japanese on Sep. 21, 2006 as International Publication No. WO 2006/098060 under PCT Article 21(2). The contents of the above applications are incorporated herein in their entireties.

FIELD OF THE INVENTION

The present invention relates to an oil-impregnated sintered bearing suitable for lubrication with a rotary shaft, which can be inserted in a bearing hole, by impregnating lubricating oil into a bearing body, and a manufacturing method thereof.

BACKGROUND OF THE INVENTION

An oil-impregnated sintered bearing which is made of a porous sintered metal and impregnates lubricating oil can be used for a long time without refueling, is excellent in resistance at a high temperature, and generates low noise. Therefore, it is broadly used as a bearing for a rotary shaft to replace a ball bearing.

In this kind of oil-impregnated sintered bearing, a bearing hole is provided in a bearing body made of a porous sintered alloy, wherein a rotary shaft with a smaller diameter than the bearing hole is inserted in the bearing hole. In the oil-impregnated sintered bearing, lubricating oil extracted from a large number of small vacancies in the bearing body by the pumping action attributed to the rotation of the rotary shaft, and oozed lubricating oil due to the expansion attributed to frictional heat forms an oil film on a sliding part with the rotary shaft. Owing to the oil film, the sintered oil-retained bearing can support the rotary shaft without causing problems such as a seizure.

In these kinds of oil-impregnated sintered bearing, a large number of vacancies which impregnate lubricating oil are formed even on the sliding surface with which the rotary shaft is slidingly-contacted. Therefore, as described above, even if the oil film is formed between the rotary shaft and sliding surface, oil pressure is decreased, because a part of the lubricating oil is leaked from the vacancies, and thus it is easy to generate local contact of the rotary shaft with the sliding surface. Therefore, these kinds of oil-impregnated sintered bearing has a defect such that the frictional coefficient to the rotary shaft becomes larger and a seizure is easily generated.

So, there is suggested an oil-impregnated sintered bearing, including a bearing body which is made of a porous sintered alloy containing vacancies and has a bearing hole in which a rotary shaft can be inserted, and a sliding surface, which is an area where the vacancies on an inner peripheral surface of the bearing hole are crushed (compressed, flattened, depressed) (for example, refer to Japanese Unexamined Patent Application Publication No. 2002-122142). In such an oil-impregnated sintered bearing, a rough part formed on the outer peripheral surface of a core rod crushes the vacancies, and thus lubricating oil is not impregnated from the sliding surface into the bearing body, and the oil film formed on the sliding surface is retained.

On the other hand, in such an oil-impregnated sintered bearing, because a large number of vacancies are formed not only on a sliding surface, with which a rotary shaft is slidingly-contacted, but are also formed on an outer peripheral surface, there is a problem in that, if the outer peripheral surface of the oil-impregnated sintered bearing is exposed when used, a part of the lubricating oil is leaked from the vacancies on the outer peripheral surface, and oil pressure becomes decreased.

Therefore, in order to prevent the leakage of the lubricating oil from the outer peripheral surface, a cylindrical attachment is provided at a used position, and the bearing is equipped in the attachment. Also in order to prevent the leakage of the lubricating oil, the outer peripheral surface of the bearing is covered with a covering material such as felt.

SUMMARY OF THE INVENTION

To cover the outer peripheral surface of the bearing with the covering material as described above, other steps are required in the manufacturing process, and consequently it causes an increase in the number of operation steps. Further, if a case made of plate, synthetic resin, and the like is provided with a cylindrical attachment, high positioning accuracy of the attachment and circularity of the inner peripheral surface are required, when high positioning accuracy of the bearing is required. Therefore, the cost of manufacturing the case is increased. Moreover, if spaces are formed between the outer peripheral surface of the bearing and the inner peripheral surface of the attachment, there is a problem in that the leakage of the lubricating oil occurs. The present invention addresses the circumstances described above, with an object of providing an oil-impregnated sintered bearing which enables the prevention of leakage of lubricating oil from an outer peripheral surface, and providing a manufacturing method thereof.

According to a first aspect of the invention, there is provided an oil-impregnated sintered bearing, which includes a bearing body made of a porous sintered alloy containing vacancies and has a bearing hole in which a rotary shaft can be inserted, wherein the vacancies opened on the outer peripheral surface of the bearing body are crushed (compressed, flattened, depressed).

Further, according to a second aspect of the invention, there is provided an oil-impregnated sintered bearing, wherein the surface vacancy rate of the part where the vacancies are crushed on the outer peripheral surface is 10% or less.

According to a third aspect of the invention, there is provided a manufacturing method of an oil-impregnated sintered bearing, which includes forming a green compact from a raw powder, sintering the green compact to form a porous sintered alloy in which vacancies are included, forming a bearing hole, in which a rotary shaft can be inserted, in the bearing body made of the sintered alloy, and crushing the vacancies opened on the outer peripheral surface of the green compact.

According to a fourth aspect of the invention, there is provided a manufacturing method of an oil-impregnated sintered bearing, which includes forming a green compact from a raw material, sintering the green compact to form a porous sintered alloy in which vacancies are included, correcting the sintered alloy, forming a bearing hole, in which a rotary shaft can be inserted, in a bearing body made of the corrected sintered alloy, and crushing the vacancies opened on the outer peripheral surface of the sintered alloy when or after the sintered alloy is corrected.

According to a fifth aspect of the invention, there is provided a manufacturing method of an oil-impregnated sintered bearing, wherein crushing the vacancies opened on the outer peripheral surface of the green compact.

According to the first aspect, because vacancies on the outer peripheral surface of the bearing are crushed, lubricating oil is not leaked from the vacancies, and an oil pressure in the bearing hole can be preserved.

Therefore, the leakage of the lubricating oil from the outer peripheral surface can be prevented, even if the circularity of an attachment part in which the bearing is incorporated cannot be guaranteed.

Further, according to the second aspect, the leakage of the lubricating oil from the outer peripheral surface can be reliably prevented, because the vacancy rate of the part where the vacancies are crushed on the outer peripheral surface is 10% or less.

According to the third aspect, by crushing the vacancies in the state of a green compact, relatively large sized vacancies can be filled. Because the vacancies opened on the outer peripheral surface of the bearing are crushed in this way, lubricating oil is not leaked from the outer peripheral surface, an oil pressure in the bearing hole can be preserved, and, even if the outer peripheral surface of the bearing is a cylindrical surface, and the circularity of an attachment in which the bearing is incorporated cannot be guaranteed, an oil-impregnated sintered bearing which can preserve an oil pressure in the bearing hole can be obtained.

According to the forth aspect, by crushing vacancies in the state of a sintered alloy after being sintered, relatively small sized vacancies can be filled. Because the vacancies opened on the outer peripheral surface of the bearing are crushed in this way, lubricating oil is not leaked from the outer peripheral surface, an oil pressure in the bearing hole can be preserved, and an oil-impregnated sintered bearing which can preserve oil pressure in the bearing hole can be obtained, even if the outer peripheral surface of the bearing is a cylindrical surface, and the circularity of an attachment in which the bearing is incorporated cannot be guaranteed.

Moreover, according to the fifth aspect, first by crushing vacancies in the state of a green compact, relatively large sized vacancies can be filled, and subsequently, by crushing vacancies in the state of a sintered alloy after being sintered, relatively small sized vacancies can be filled.

DETAILED DESCRIPTION OF THE INVENTION

As follows is a detailed description of the preferred embodiments in the present invention, referring to the attached drawings. The embodiments described below do not restrict the content of the present invention described in claims. Moreover, not all of the components described below are always required indispensably in the present invention. In each embodiment, there is described a non-conventional oil-impregnated sintered bearing and a manufacturing method thereof, which are obtained by using a novel oil-impregnated sintered bearing and a manufacturing method thereof.

Embodiment 1

Figure 7:
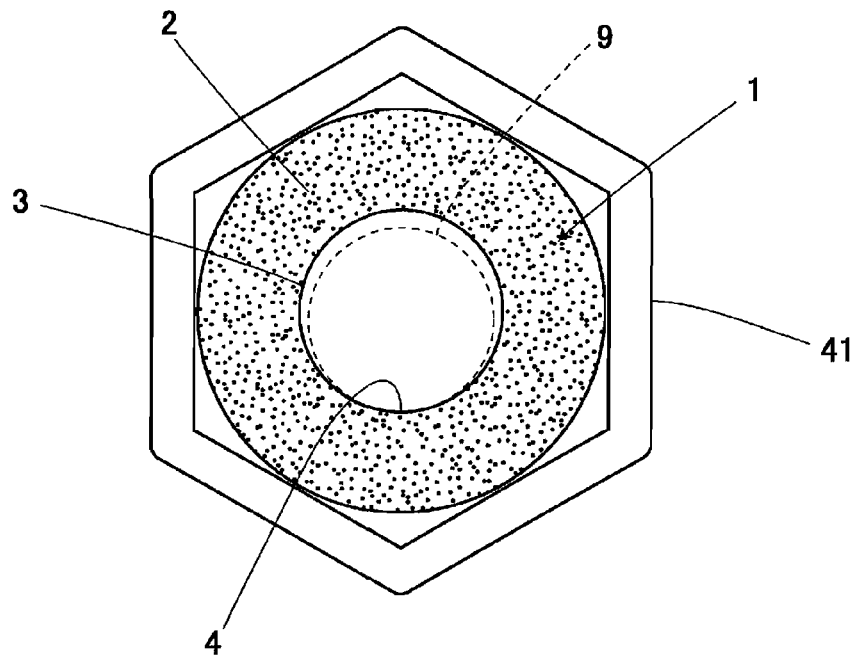
FIG. 7 is a front view which shows the state in which an attachment part is incorporated with a bearing in the embodiment 1 of the present invention.
Figure 8:
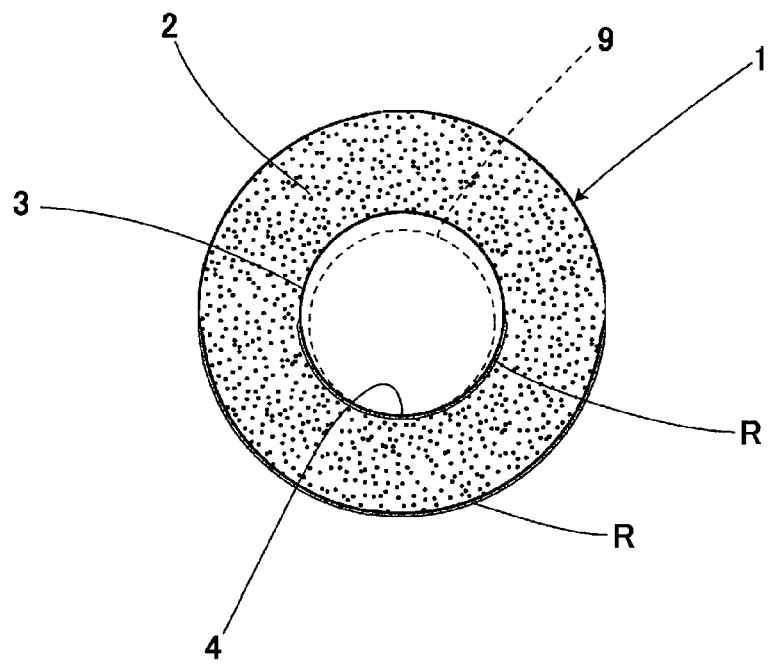
FIG. 8 is a front view which shows embodiment 2 in the present invention.

The embodiments in the present invention are described below. FIG. 1 to FIG. 6 show an embodiment of the present invention. As showed in the drawings, an oil-impregnated sintered bearing 1 is a bearing wherein a bearing hole 3 is provided in a bearing body 2 made of a porous sintered alloy in which vacancies are included. The oil-impregnated sintered bearing 1 is in a cylindrical form, and, as shown in FIG. 7 and FIG. 8, a rotary shaft 9, whose external diameter is smaller than that of the bearing hole 3, is inserted in the bearing hole 3. A sliding surface 4 is the inner peripheral surface of the bearing hole 3, and the rotary shaft 9, which is inserted in the bearing hole 3, is rotated so that the outer peripheral surface of the rotary shaft 9 is slidingly contacted with the sliding surface 4. Further, end faces 6 and 6, which are parallel to each other and flat, are provided at the both sides in the length direction of the sliding surface 4.

Described in detail, the bearing body 2 includes vacancies 8 to contain lubricating oil all over the internal circumferential direction. As a result, it can be spread to every part of the bearing body 2 without being interrupted at any section, because the lubricating oil can move freely in the circumferential direction in the bearing body 2, which can contain a large quantity of the lubrication oil.

On the other hand, an outer peripheral surface 7 of the bearing body 2 is in the state such that a large number of vacancies 8 are crushed, or the average diameter of vacancies 8 becomes smaller. Thus, the surface vacancy rate per unit area of the outer peripheral surface 7 is low, and the surface vacancy rate is 10% or less, preferably 5% or less.

Next, an example of a manufacturing method of the oil-impregnated sintered bearing 1 which has the composition described above will be described, referring mainly to FIG. 2 to FIG. 5. The oil-impregnated sintered bearing 1 is made by the steps of forming a green compact by pressing a raw powder such as a Cu—Su—C system and Fe system, and sintering it, and then correcting the shape thereof.

Figure 1:
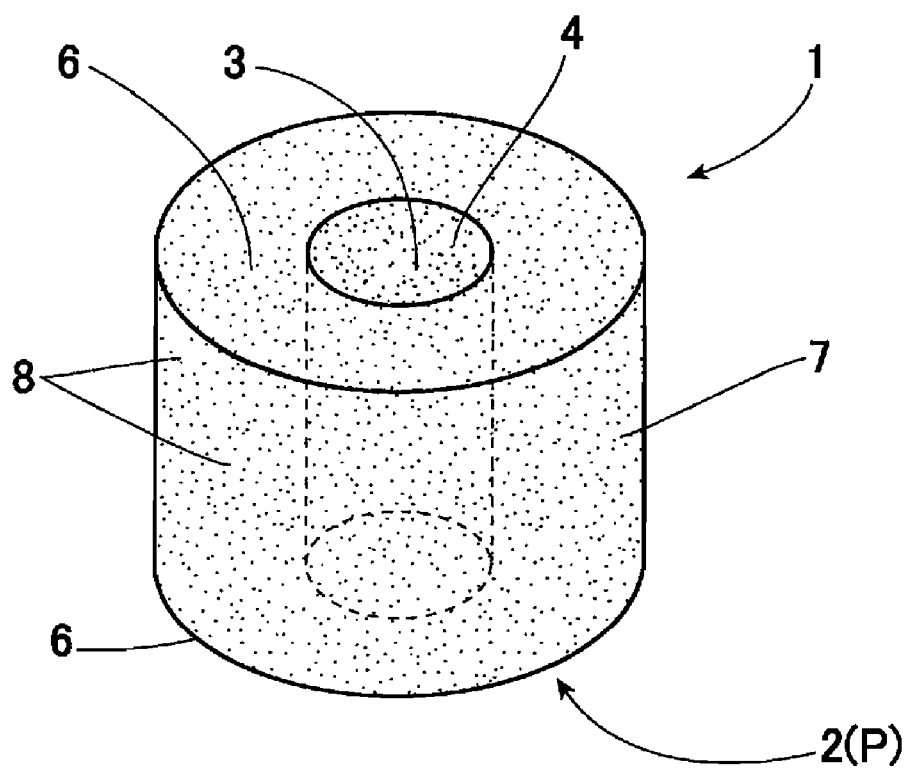
FIG. 1 is a perspective view of a bearing in embodiment 1 of the present invention.
Figure 2:
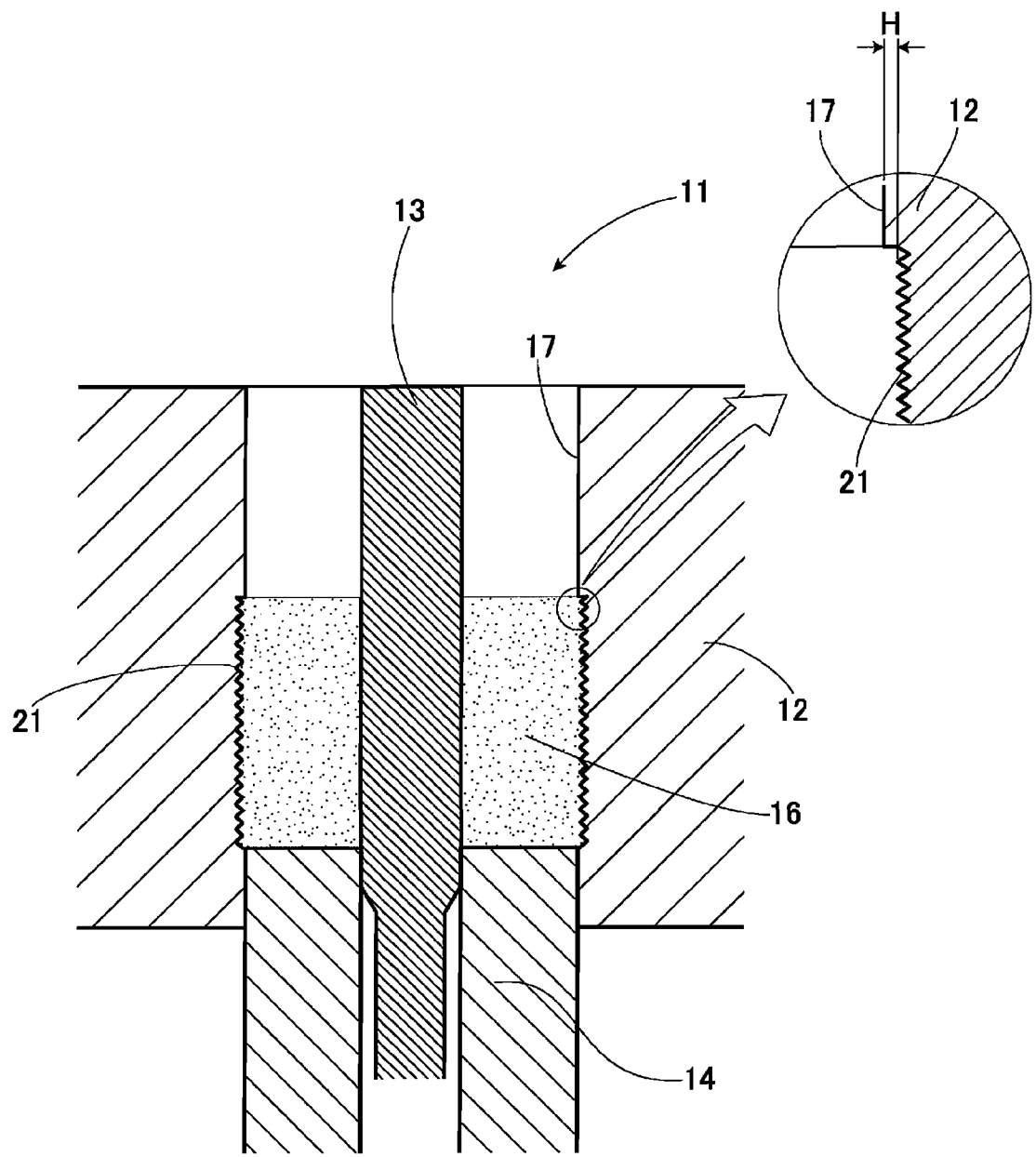
FIG. 2 is a sectional view of a forming mold before being filled with a raw material in the embodiment 1 of the present invention, and a part of the mold is enlarged.
Figure 3:
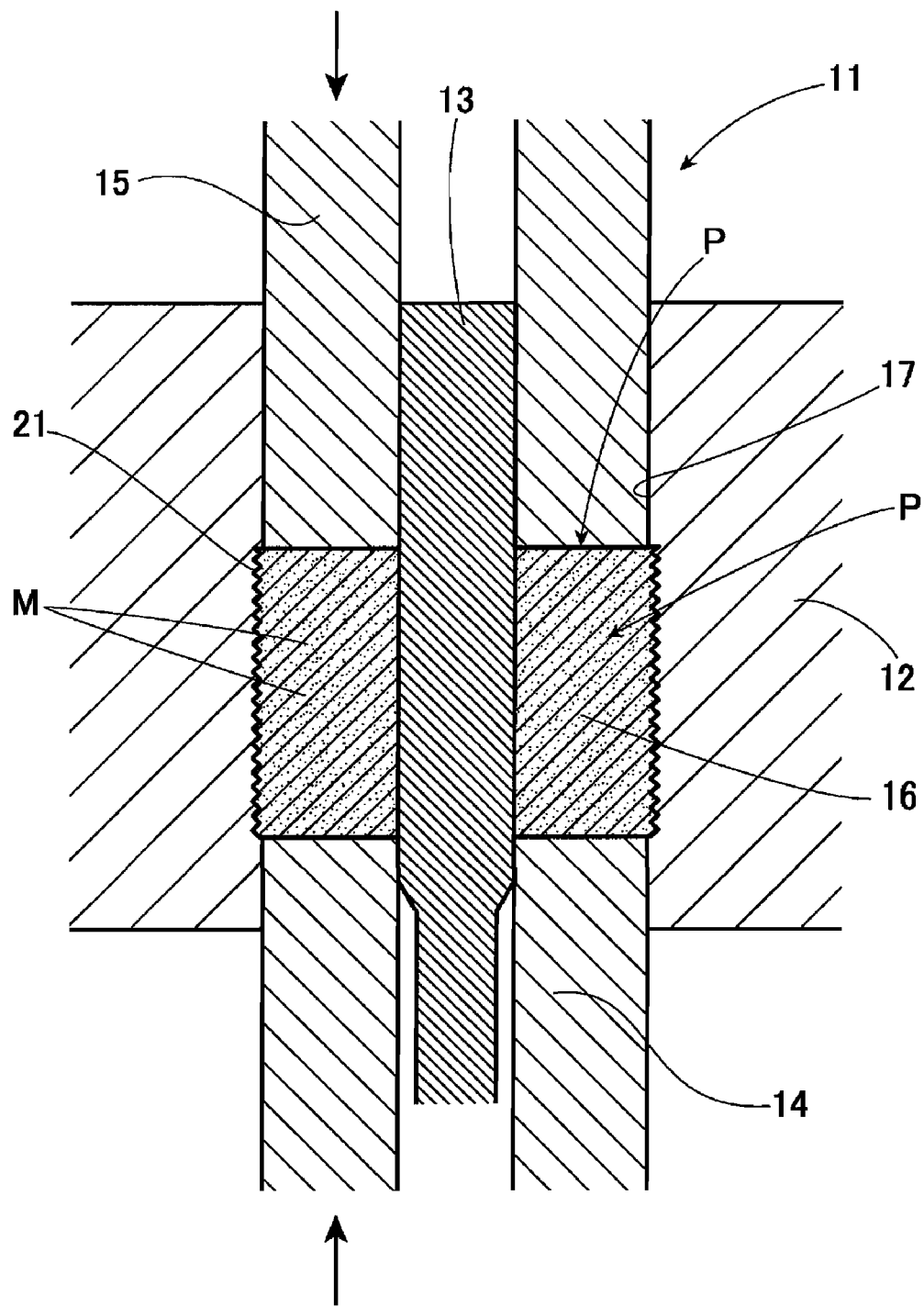
FIG. 3 is a sectional view of a forming mold in the compressing process in the embodiment 1 of the present invention.

FIG. 2 and FIG. 3 show a forming mold 11, and FIG. 3 further shows the state in which a green compact P is formed by pressing a raw powder M. As showed in the figures, the axial direction of the forming mold 11 used to form the green compact is the vertical direction (press-vertical-axis direction), and the forming mold 11 is equipped with a die 12, a core rod 13, a lower punch 14, and an upper punch 15. The die 12 is almost in a cylindrical shape, and the core rod 13, which is almost in a cylindrical shape, is located in the die 12 and on the same axis as the die 12. The lower punch 14 is almost in a cylindrical shape, and is fit between the die 12 and the core rod 13 with free vertical movement from the lower side. The upper punch 15 is almost in a cylindrical shape, and is fit between the die 12 and the core rod 13 with free vertical movement from the upper side, so that it can be freely put in and taken out. A filling part 16 is formed among the die 12, the core rod 13, and the lower punch 14. The inner peripheral surface of the die 12 forms the outer peripheral surface 7 of the green compact P, the upper surface of the lower punch 14 forms one of the end faces 6 thereof, the lower side of the upper punch 15 forms the other end face 6 thereof, and the outer peripheral surface of the core rod 13 forms the sliding surface 4 thereof.

A rough part 21 is formed on an inner peripheral surface 17 of the die 12, by grinding, cutting, and electrically discharging. The length of the rough part 21 is almost the same as, or longer than, the length of the green compact P of the bearing body 2. The rough part 21 is formed in all circumferences. The surface roughness of the rough part 21 is selected according to the particle size of the raw powder to be formed, and it is set to 2 to 15 S in the example, preferably 5 to 8 S. On the other hand, the inner peripheral surface 17 of the die 12 is in a mirrored form by a mirror-like finishing. The depth H of an internal circumference's end is about 0 to 0.01 mm, preferably 0.001 to 0.003. At least the inner peripheral surface 17 at a more upper side than the rough part 21 is in mirrored form.

As shown in FIG. 3, the filling part 16 is filled with a raw powder M, and the green compact P is formed by pressing the raw powder M in the filling part 16 using an upper punch 15 and a lower punch 14. Subsequently, the upper punch 15 is raised to the upper side of the die 12, and, when the green compact P is pushed out from the die 12 by raising the lower punch 14, vacancies 8 on the outer peripheral surface 7 of the green compact P are crushed by the rough part 21, which is formed on the inner peripheral surface 17 of the die 12, and the inner peripheral surface 17 in mirrored form and at a more upper side than the rough part 21.

That is, in the filling part 16, the shape of the rough part 21 of the die 12 is printed on the outer peripheral surface 7 of the green compact P, and, because the rough part 21 is located further outsider than the inner peripheral surface 17, which is in mirrored form, the outer peripheral surface 7 of the green compact P is formed slightly wider than the inner peripheral surface 17 and with microasperity. When the green compact P is pushed out by the lower punch 14, the part with microasperity on the outer peripheral surface 7 is ground by the rough part 21, and the ground fragments and the small pieces thereof are put in the vacancies 8 of the outer peripheral surface 7. Further, it is smoothed by the inner peripheral surface 17, which is in mirrored form, and consequently the vacancies 8 are filled. In other words, when the green compact P is pushed out, the outer peripheral surface 7 is compressed, the part which is wider than the inner peripheral surface 17 and with microasperity on the green compact P is put in the vacancies 8, and thus the vacancies 8 are filled. In this case, because these steps are carried out before the green compact P is sintered, relatively large sized vacancies can be crushed on the outer peripheral surface 7 of the green compact P. Because the part with microasperity and which is wider than the inner peripheral surface 17 is ground, and the green compact P is pushed to the emitted side of the inner peripheral surface 17 in this way, it is difficult to push it if the depth H is more than 0.01 mm. Therefore, as described above, the depth H is set to 0.01 mm or less, preferably 0.003 mm or less.

Figure 4:
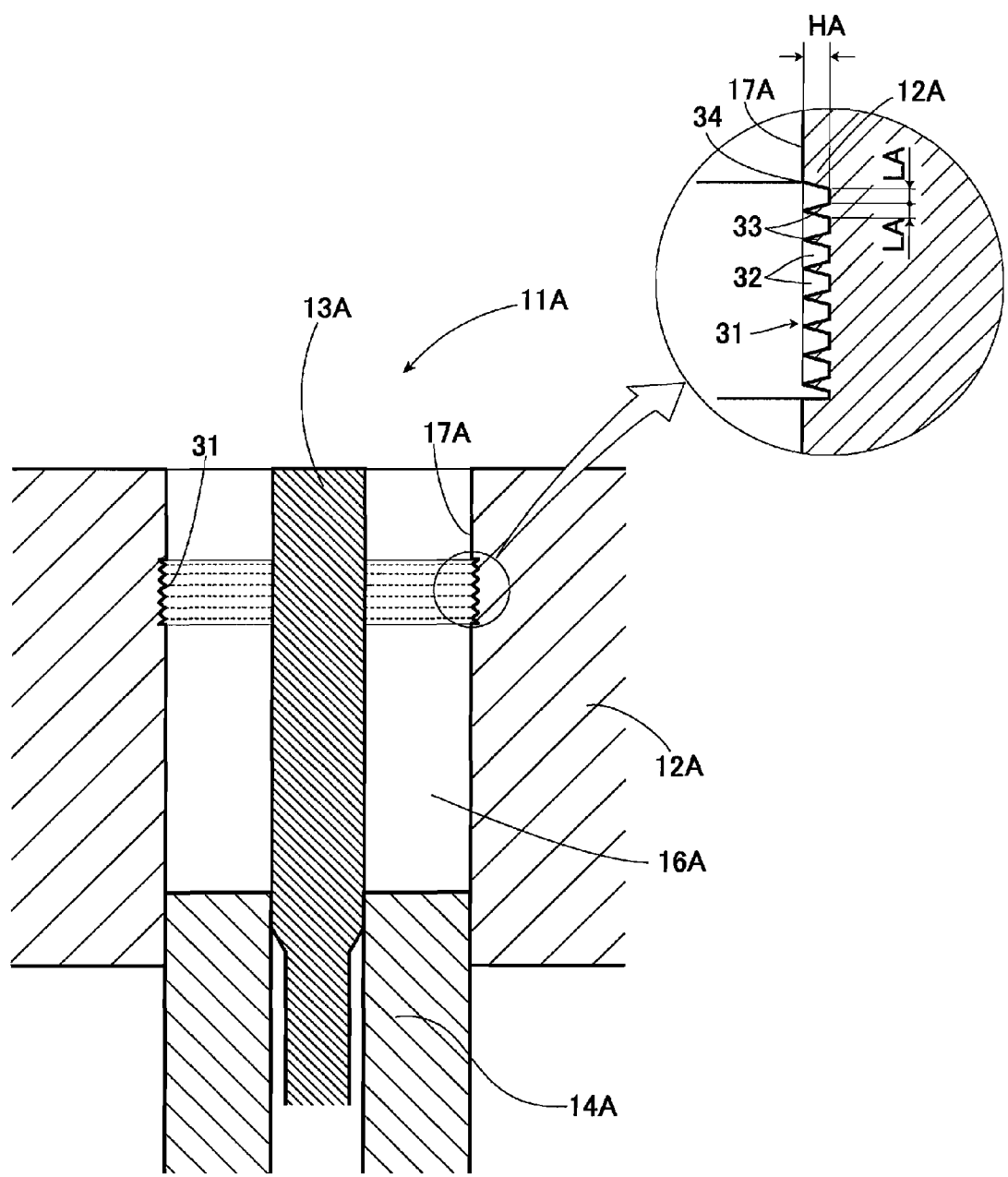
FIG. 4 is a sectional view of a correcting mold before being filled with a sintered alloy in the embodiment 1 of the present invention, and a part of the mold is enlarged.
Figure 5:
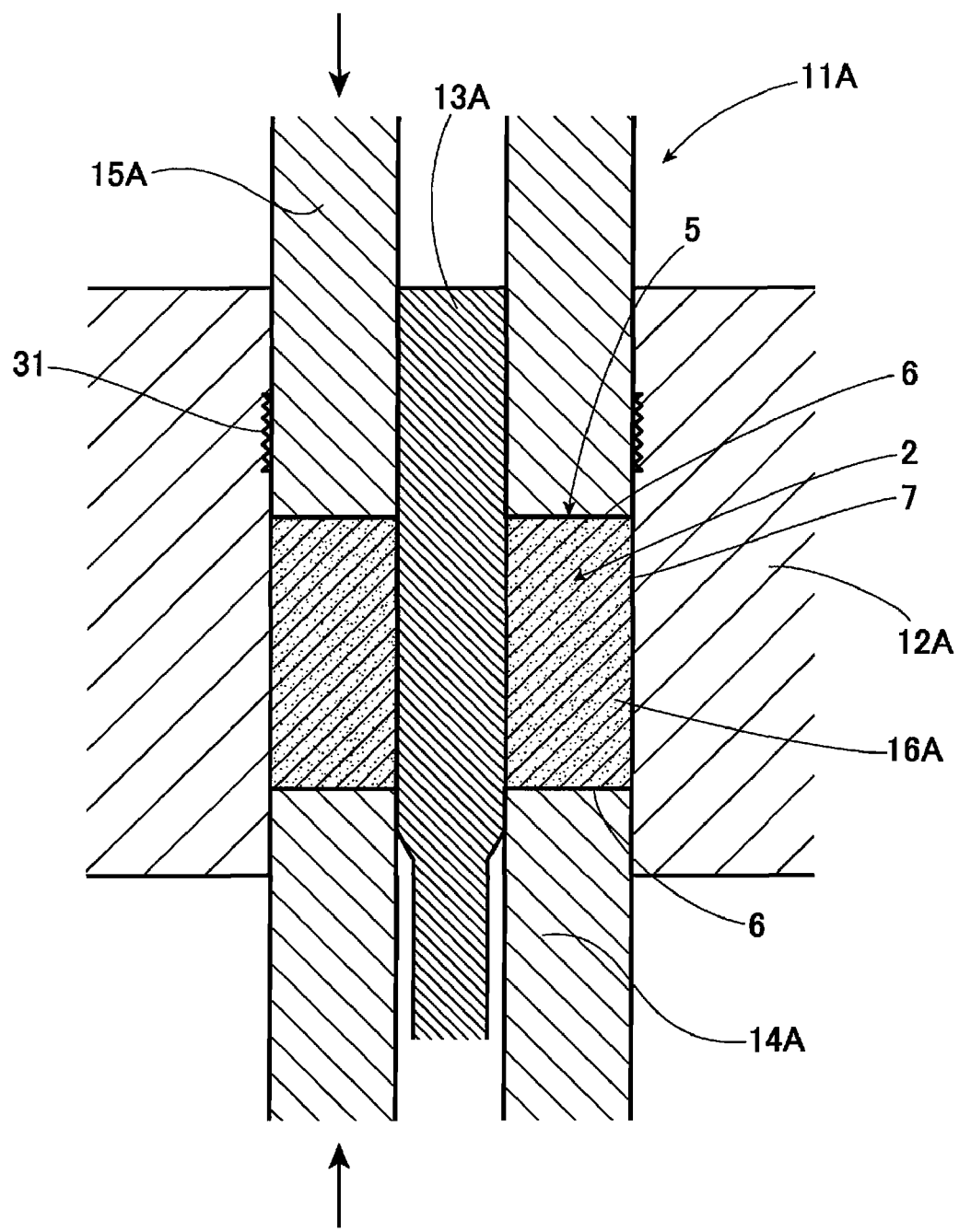
FIG. 5 is a sectional view of a correcting mold in the state to be compressed and corrected in the embodiment 1 of the present invention.

The bearing body 2 is made by sintering the green compact which is formed by the process described above. Moreover, the bearing body 2, which is made of a sintered alloy, is corrected to the predetermined dimension. FIG. 4 and FIG. 5 show a correcting mold 11A. The axial direction of the correcting mold 11A is the vertical direction (press-vertical-axis direction). The correcting mold 11A is equipped with a die 12A, a core rod 13A, a lower punch 14A, and an upper punch 15A. The die 12A is almost in a cylindrical form, and the core rod 13A, which is almost in a cylindrical form, is located in the die 12A and on the same axis as the die 12A. The lower punch 14A is almost in a cylindrical form, and is fit between the die 12A and the core rod 13A with free vertical movement from the lower side. The upper punch 15A is almost in a cylindrical form, and is fit between the die 12A and the core rod 13A with free vertical movement from the upper side, so that it can be freely put in and taken out. A correcting part 16A is formed among the die 12A, the core rod 13A, and the lower punch 14A.

A smoothing part 31 is formed on an inner peripheral surface 17A of the die 12A by grinding, cutting, and electrically discharging. In this example, the length of the smoothing part 31 is shorter than the length of the bearing body 2. The smoothing part 31 is provided at a more upper side than the correcting part 16A where the bearing body 2 is corrected in the die 12A. The smoothing part 31 is formed lining up a plurality of recessed parts 32 in the length direction. A salient part 33 is formed between the recessed parts 32 and 32, and the front edge of the salient part 33 is formed in the same diameter as the outer peripheral surface 17A. A depth HA of the recessed part 32 is about 0.01 mm, and a length LA of the bottom of the recessed part 32 and the salient 33 is about 0.1 mm. The depth HA of the recessed part 32 and the height of the salient part 33 are the same.

As shown in FIG. 5, the bearing body 2 is placed in the correcting part 16A, and the bearing body 2 is corrected by compressing the bearing body 2 in the correcting part 16A using the upper punch 15A and the lower punch 14A. Further, in the subsequent step, when the upper punch 15A is raised to the upper side of the die 12A, and the bearing body 2 is pushed out from the die 12A by raising the lower punch 14A, the vacancies 8 are crushed by the smoothing part 31, which is formed at a more upper side than the correcting part 16A on the inner peripheral surface 17A of the die 12A.

That is, in the correcting part 16A, the bearing body 2 is compressed and corrected, and the outer peripheral surface of the bearing body 2 is ground by a plurality of the salient parts 33 and an edging part 34 between the recessed part 32 and the inner peripheral surface 17A at the emitted side. The fragments and the pieces thereof are put in the vacancies 8, therefore the vacancies 8 are filled. In this case, the inner peripheral surface 17A, the salient part 33, and the edging part 34 between the recessed part 32 and the inner peripheral surface 17A at the emitted side have the same diameters. However, because of the springback of the bearing body 2 caused by the compression and correction thereof in the correcting part 16A, the outer peripheral surface 7 in the bearing body 2 between the salient part 33 and the edging part 34 slides, and then the vacancies 8 on the outer peripheral surface 7 of the bearing body 2 are filled.

Figure 6:
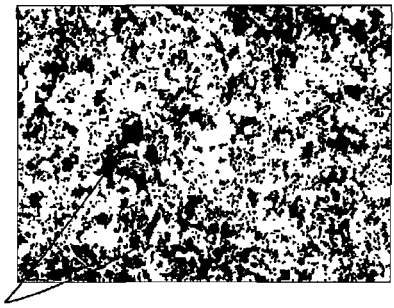
FIG. 6 is a drawing which shows the binary images of the enlarged pictures on an outer peripheral surface of a bearing in the embodiment 1 of the present invention.
Figure 6:
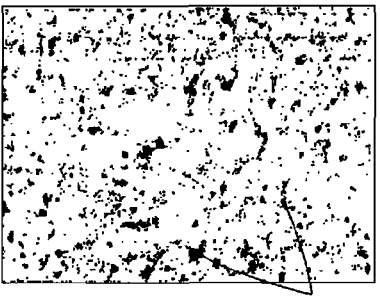
Figure 6:
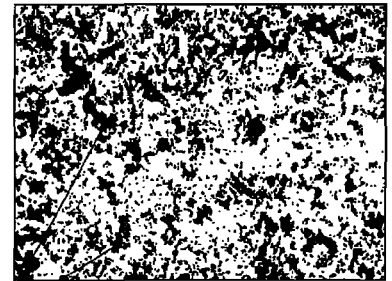
Figure 6:
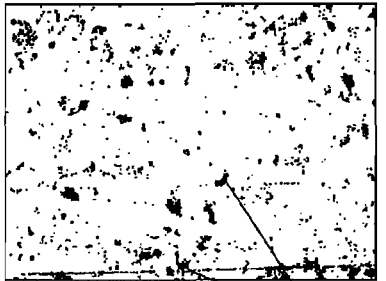
Figure 6:
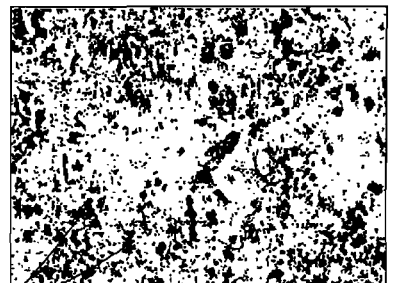
Figure 6:
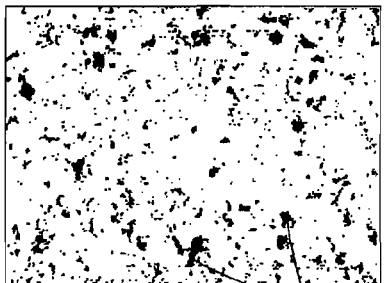

FIG. 6 shows the binary images of the enlarged pictures on the outer peripheral surface 7 of the bearing 1 "without treatment", in which the vacancies 8 are not crushed when the bearing is formed and corrected, and the bearing 1 "with treatment", in which the vacancies 8 are crushed when the bearing 1 is formed and corrected. No. 1 shows the binary image of the bearing 1 with the density of 6.7 g/cm$^3$, No. 2 shows the binary image of the bearing 1 with density of 6.9 g/cm$^3$, and No. 3 shows the binary image of the bearing 1 with the density of 7.1 g/cm³. As a result, it is obvious that the surface vacancy rate is decreased to a large extent in the bearing 1 "with treatment".

FIG. 7 shows an example of the attached structure of the bearing 1. An attachment part 41, with which the bearing 1 is incorporated, is provided at a housing and the like made of a sheet metal or a synthesized resin, and an inner peripheral surface of the attachment part 41 is in a polygonal form. In this example, it is hexagonal. Then, the bearing 1 is fit and fixed by press fitting. The bearing 1 is specified at six positions, thus the centering of the bearing 1 is easier than a bearing with an attachment part in a cylindrical form. On the other hand, there is a problem in that spaces are generated between the outer peripheral surface 7 of the bearing 1 and the inner peripheral surface of the attachment part 41.

Using the method described above, the surface vacancy rate is set to 10% or less, preferably 5% or less in the present invention. Therefore, the leakage of the lubricating oil from the outer peripheral surface 7 of the bearing body 2 can be prevented, and the oil pressure in the sliding surface 4 can be preserved.

The embodiment corresponds to an aspect of the invention, wherein an oil-impregnated sintered bearing 1 includes a bearing body 2 which is made of a porous sintered alloy containing vacancies 8 and has a bearing hole 3 in which a rotary shaft 9 is inserted. In the embodiment, the vacancies 8 opened on a outer peripheral surface 7 of the bearing body 2 are crushed, so the leakage of the lubricating oil from the outer peripheral surface 7 of the bearing 1 is prevented, and the oil pressure in the bearing hole 3 can be preserved.

Therefore, even if the circularity of an attachment part in which the bearing 1 is incorporated cannot be guaranteed, the leakage of the lubricating oil from the outer peripheral surface 7 can be prevented.

Further, the embodiment corresponds to a further aspect of the invention, wherein the surface vacancy rate of the part where the vacancies 8 is crushed on the outer peripheral surface 7 is 10% or less, thus the leakage of the lubricating oil from the outer peripheral surface 7 can be reliably prevented.

The embodiment corresponds to another aspect of the invention, wherein a manufacturing method of an oil-impregnated sintered bearing 1 includes forming a green compact P from a raw powder, sintering the green compact P to form a porous sintered alloy in which vacancies 8 are included, and forming a bearing hole 3, in which a rotary shaft 9 can be inserted, in a bearing body 2, which is made of a sintered alloy. In the embodiment, relatively large sized vacancies 8 can be filled by crushing the vacancies 8 in the state of the green compact P, because the vacancies 8 opened on the outer peripheral surface of the green compact P are crushed. Therefore, even if the outer peripheral surface 7 of the bearing 1 is cylindrical, and the circularity of an attachment part in which the bearing is incorporated cannot be guaranteed, the oil-impregnated sintered bearing 1 which can preserve the oil pressure in the bearing hole 3 can be obtained.

The embodiment corresponds to a further aspect of the invention, wherein a manufacturing method of an oil-impregnated sintered bearing includes forming a green compact P from a raw powder, sintering the green compact P to form a porous sintered alloy in which vacancies 8 are included, correcting the sintered alloy, and forming a bearing hole, in which a rotary shaft 9 can be inserted, in a bearing body 2, made of the corrected sintered alloy. In the embodiment, because the vacancies 8 opened on the outer peripheral surface of the sintered alloy are crushed when the sintered alloy is corrected, relatively small sized vacancies 8 can be filled by crushing the vacancies 8 in the state of the sintered alloy after sintered. Because the vacancies 8 opened on the outer peripheral surface 7 of the bearing 1 are crushed in this way, the leakage of the lubricating oil from the outer peripheral surface 7 can be prevented, and the oil pressure in the bearing hole can be preserved. Therefore, even if the outer peripheral surface of the bearing 1 is a cylindrical, and the circularity of an attachment part in which the bearing 1 is incorporated cannot be guaranteed, the oil-impregnated sintered bearing 1 which can preserve the oil pressure in the bearing hole 3 can be obtained. The vacancies 8 on the outer peripheral surface 7 may be crushed by any appropriate means, after being corrected and pushed out of the die 12.

Further, the embodiment corresponds to an aspect of the invention, wherein the vacancies 8 opened on the outer peripheral surface of the green compact P are crushed. In the embodiment, first, by crushing the vacancies 8 in the state of the green compact P, relatively large size of the vacancies 8 can be filled. Next, by crushing the vacancies 8 in the state of the sintered alloy after being sintered, relatively small sized vacancies 8 can be filled.

As an effect of the embodiment, the vacancies 8 can be crushed without increasing the number of manufacturing steps, because the vacancies 8 on the outer peripheral surface 7 of the green compact P or the bearing body 2 can be crushed when the green compact P or the bearing body 2 are pushed out of the mold 11 or 11A.

Embodiment 2

FIG. 8 shows another embodiment of the present invention. The same symbols are given to the same parts as those used in the embodiment above, and the detailed description is omitted. In this embodiment, the vacancies 8 are crushed on an area (a semicircular half area) of the outer peripheral surface 7. The vacancies 8 on the half area of the outer peripheral surface 7 at the circumferential direction are filled. If the vacancies 8 on the outer peripheral surface 7 are crushed in the green compact P, the rough part 21 is formed at the half of the inner peripheral surface 17 of the die 12 of the forming mold 11. If the vacancies 8 on the outer peripheral surface 7 are crushed in the sintered alloy 2 after being sintered, the smoothing part 31 is formed at the half of the inner peripheral surface 17 of the die 12A of the correcting mold 11A. The surface vacancy rate in these cases is the dimensional percentage of the vacancies 8 on an area R, which is the half area of the outer peripheral surface 7.

Further, the vacancies 8 on the half of the sliding surface 4 (semicircular half area) of the bearing hole 3 are crushed at the same side as the part where the vacancies 8 are filled on the outer peripheral surface 7. In the oil-impregnated sintered bearing 1 in this embodiment, the area R (semicircular half area) where the vacancies 8 are filled is set to the bottom side. By crushing the vacancies 8 on the sliding surface 4 in this way, the lubricating oil on the sliding surface 4 is not leaked into the bearing 1. A tight oil surface is formed on the area where the vacancies 8 are filled on the sliding surface 4. Thus, a smooth rotation of the rotary shaft can be guaranteed.

Furthermore, different from the conventional cases where the lubricating oil is leaked easily from the bottom side, even if the area R where the vacancies 8 are filled on the outer peripheral surface 7 is set to the bottom side, the lubricating oil is not leaked from here, because the vacancies 8 in the area R are crushed. Moreover, because the area R where the vacancies 8 are filled on the outer peripheral surface 7 can be discriminated in appearance, the area R where the vacancies 8 are filled on the outer peripheral surface 7 can be used as the mark to check the direction of the bearing 1, when the bearing 1 is incorporated with the attachment part 41.

In the embodiment above, because the vacancies 8 opened on the outer peripheral surface 7 of the bearing body 2 are crushed, the lubricating oil is not leaked from the outer peripheral surface 7 of the bearing 1, the oil pressure in the bearing hole 3 can be preserved.

The present invention is not restricted to the embodiments described above, and various arrangements to the embodiments can be carried out. For example, the area where the vacancies are crushed may be all of the outer peripheral surface, as in the case of the embodiment further above, or a part thereof, as in the case of the embodiment above. Further, the vacancies may be crushed only in the state of the green compact, and the vacancies of the sintered alloy may not be crushed when the sintered alloy is corrected. Furthermore, the correction may not always be carried out.

The invention claimed is:

1. An oil-impregnated sintered bearing, comprising:
    a cylindrical bearing body which is made of a porous sintered alloy containing vacancies and having a bearing hole into which a rotary shaft may be inserted,
    wherein the bearing body has an outer peripheral surface and an inner peripheral surface,
    the outer peripheral surface is divided into a semicircular first half area and a semicircular second half area in a circumferential direction of the outer peripheral surface,
    the inner peripheral surface is divided into a semicircular first half area and a semicircular second half area in a circumferential direction of the inner peripheral surface,
    the first half area of the outer peripheral surface and the first half area of the inner peripheral surface are on the same side of the cylindrical bearing body,
    the second half area of the outer peripheral surface and the second half area of the inner peripheral surface are on the same side of the cylindrical bearing body,
    the vacancies on the first half area of the outer peripheral surface and the first half area of the inner peripheral surface have a crushed shape,
    a surface vacancy rate per unit area of the first half area of the outer peripheral surface and the first half area of the inner peripheral surface is 10% or less,
    the vacancies on the second half area of the outer peripheral surface and the second half area of the inner peripheral surface are not crushed, and
    a surface vacancy rate per unit area of the second half area of the outer peripheral surface and the second half area of the inner peripheral surface is higher than that of the first half area of the outer peripheral surface and the first half area of the inner peripheral surface.

2. An oil-impregnated sintered bearing according to claim 1, wherein the first half area of the outer peripheral surface and the first half area of the inner peripheral surface are on the bottom side of the cylindrical bearing body, the second half area of the outer peripheral surface and the second half area of the inner peripheral surface are on the upper side of the cylindrical bearing body.

* * * * *